United States Patent [19]
Dal Monte

[11] Patent Number: 5,664,841
[45] Date of Patent: Sep. 9, 1997

[54] MOTOR-VEHICLE SEAT

[75] Inventor: Antonio Dal Monte, Rome, Italy

[73] Assignee: Lear Corporation Italia Spa, Turin, Italy

[21] Appl. No.: 641,034

[22] Filed: Apr. 30, 1996

[30] Foreign Application Priority Data

Jul. 19, 1995 [IT] Italy ................... TO95A0619

[51] Int. Cl.$^6$ ................... A47C 7/36; A47C 7/44; B60N 2/48
[52] U.S. Cl. ................... 297/408; 297/410; 297/440.2; 297/452.5; 297/284.4
[58] Field of Search ................... 297/408, 409, 297/410, 284.4, 452.31, 452.32, 452.49, 452.5, 452.54, 440.2

[56] References Cited

U.S. PATENT DOCUMENTS

| | | |
|---|---|---|
| 4,637,655 | 1/1987 | Fourrey et al. ................... 297/408 |
| 4,668,014 | 5/1987 | Boisset ................... 297/408 |
| 4,923,250 | 5/1990 | Hattori ................... 297/408 |
| 5,217,278 | 6/1993 | Harrison et al. ................... 297/284.4 |
| 5,397,164 | 3/1995 | Schuster et al. ................... 297/284.4 |
| 5,464,269 | 11/1995 | Mizelle ................... 297/408 |

*Primary Examiner*—Peter M. Cuomo
*Assistant Examiner*—Anthony D. Barfield
*Attorney, Agent, or Firm*—Sughrue, Mion, Zinn, Macpeak & Seas

[57] ABSTRACT

There is described a motor-vehicle seat having a head-rest which is adjustable both in height and in a way in which it tilts around a transverse axis with its lower edge more or less forwardly displaced. The backrest is further provided with a padding module which can be connected rapidly to the supporting body of the seat and includes a skeleton with a flexible arched spine, with adjustable arching, and strengthening transverse ribs.

22 Claims, 6 Drawing Sheets

MOTOR-VEHICLE SEAT

BACKGROUND OF THE INVENTION

The present invention relates to motor-vehicle seats.

In recent years more and more research has been directed towards seats which on one hand are able to be adapted in the best possible way to the specific features of the body of the user to ensure an ergonomically proper posture and which on the other hand have a relatively simple and light structure, characterized by the possibility of rapidly replacing the padding portion of the seat in order to rationalize and simplify the mass production of different seat models, as well as to enable the user to replace easily the padding when the latter is damaged or worn.

SUMMARY OF THE INVENTION

With reference to the problem of adapting the seat to the specific features of the body of the user, an object of the present invention is in particular that of providing a seat having a head-rest which allows adjustment movements which are optimized for the above indicated end, the whole with a relatively simple, reliable and unexpensive structure.

In view of achieving these objects, the present invention provides a motor-vehicle seat, comprising:

a backrest, having a supporting structure, and a head-rest, including a supporting frame mounted onto the backrest supporting structure, characterized in that said supporting frame of the head-rest is mounted on the supporting structure so as to be both displaceable along a substantially vertical direction and pivotable around a transverse axis with respect to the backrest supporting structure, and in that there are provided two separate flexible cable control means, respectively for controlling said two movements of the head-rest frame, in order to adjust the position of the latter.

In a preferred embodiment, the head-rest frame is mounted so as to be rotatable around a first transverse axis onto the backrest supporting structure while being slidable along a substantially vertical direction, and there is provided an auxiliary arm having an upper end pivoted to the lower end of the head-rest frame and a lower end pivoted around a second transverse axis to the backrest supporting structure, said second transverse axis being displaceable along a substantially vertical direction.

In this embodiment, said control means comprise:

a first flexible cable having one end connected to the head-rest frame and arranged so as to pull said frame upwardly, causing said movement along a substantially vertical direction with respect to the backrest supporting structure, when said first cable is put under tension, a second flexible cable interposed between said frame and said auxiliary arm so as to cause the angle defined between said frame and said auxiliary arm to be decreased when said second cable is put under tension, and a single return spring interposed between the backrest supporting structure and said auxiliary arm so as to bias said second transverse axis downwardly.

Due to said features, an adjustment system for the head-rest is obtained with simple, reliable and unexpensive means, wherein the head-rest is movable vertically between two end positions to be adapted to the various possible heights of the user, while being rotatable around said first transverse axis, so that the lower edge of the head-rest is moved between a rearwardly fully displaced position and a forwardly fully displaced position. This second adjustment movement allows the position of the headrest to be adapted to the position in space of the head of the user, by arranging the head-rest in a position immediately adjacent to the head of the user.

In said preferred embodiment, said headrest frame is slidably and rotatably mounted on said first transverse axis by engagement of a first transverse shaft carried by the backrest supporting structure within at least one guide slot formed in said frame. Yet in the preferred embodiment, said first flexible cable is directed around said first transverse shaft and has its end opposite to the end connected to said headrest frame which is connected to a device for controlling tensioning of the cable by a lever system which multiplies the cable movement. In this manner, a small linear displacement controlled by said device for controlling the cable tension is transformed in a more extended displacement of the head-rest along the adjustment vertical direction.

Yet in said preferred embodiment, said auxiliary arm carries a second transverse shaft which is slidably and rotatably guided within at least one guide slot formed in the backrest supporting structure, said second cable having one end connected to said frame, a sheath connected to said auxiliary arm and the other end connected to a device for controlling the cable tension.

The said devices for controlling the cable tension preferably each comprise a screw-and-nut mechanism controlled by either a control knob or an actuating electric motor.

According to a further feature of the present invention, the backrest supporting structure is preferably comprised of a tray-shaped body, with a cavity facing forwardly, which receives said head-rest at its upper portion. Preferably, said body is comprised of a structure in one piece of light alloy.

Yet according to a further aspect of the present invention, said backrest supporting structure is provided with quick coupling means for mounting thereon of a padding module and said module includes a supporting skeleton and a padding provided with a cover and mounted onto the supporting skeleton. Said supporting skeleton includes a flexible arched spine, whose arched configuration is adjustable, and a plurality of substantially rigid transverse ribs adapted to keep the configuration of the padding module substantially constant in a cross-section lying in a horizontal plane, said seat further comprising flexible cable control means to cause arching of said spine.

Due to said features, the advantage is achieved to allow rapid mounting and dismantling, or replacing, of the backrest padding and on the other hand an optimum adjustment is obtained of the arching of the backrest in order to provide adequate support to the user's back, particularly at the lumbar area. The use of the strengthening transverse ribs however keeps the geometry of the backrest substantially constant with respect to a cross section in a horizontal plane, while the degree of arching of the spine of said skeleton of the padding module is varied.

In said preferred embodiment, between said backrest supporting structure and said padding module there are interposed spring means. Preferably, these spring means are comprised of a plurality of pairs of helical springs, the springs of each pair being supported in a cantilever fashion by the backrest supporting structure and the padding module, respectively, and being adapted to engage with each other concentrically with a forced fit, so as to form said quick coupling means while fulfilling the function of a suspension for the padding module. In this case, said springs are preferably each provided with a covering sheath, to prevent jamming between their respective loops in the condition of mutual engagement of the springs of each pair.

Yet in said embodiment, said flexible cable control means for the arching of the skeleton of the padding module comprise a flexible cable arranged so as to tend to move the ends of said spine towards each other when said cable is put under tension. Also in this case there is provided a device for controlling tension of said cable, including a screw-and-nut mechanism controlled either by a control knob or an actuating electric motor.

In a possible variant, said padding module is supported by said backrest supporting structure so as to be movable in a substantially vertical direction with respect to said supporting structure and there are provided spring means to bias the padding module downwardly and flexible cable control means to cause a movement of said module upwardly, against the action of said spring means. In this manner, it is possible to adjust the position of the whole padding module along the vertical direction, in order to adapt it to the various possible configurations of the body of the user.

In the case of the cited example, in which there are provided said concentric springs to constitute both the suspension of the padding module and the quick coupling means for coupling the padding module to the backrest supporting structure, these springs also allow, due to their flexibility, some displacement along the vertical direction of the whole padding module.

A further advantage of the above described arrangement lies in that the conventional body of foamed material constituting the seat padding, connected to said skeleton, may be of a very reduced thickness, so as to favour transpirability of the seat and thus having a greater ability of absorbing transpiration. The reduction of the quantity of foamed material used in the padding also provides for a lighter overall unit and poses less problems with respect to disposal or recycling of this foamed material at the end of the life of the seat.

As it is clearly apparent from the foregoing description, all the said advantages are obtained with an extremely simple and unexpensive structure which nevertheless is efficient and reliable.

In order to provide for an optimum adaptation of the seat cushion to the features of the seated person, this cushion has a front portion divided into two separate portions by a middle longitudinal slit, said separate portions being separately adjustable in height by means of two respective control devices. In one embodiment, each of said portions has a structure which is arched upwardly in its undeformed condition, which can be elastically deflected downwardly by the respective control device which for example is of the flexible cable type.

BRIEF DESCRIPTION OF THE DRAWINGS

Further features and advantages of the invention will become apparent from the description which follows with reference to the annexed drawings, given purely by way of non limiting example, in which.

DETAILED DESCRIPTION OF THE PREFERRED EMBODIMENTS

In the drawings, reference numeral 1 generally designates a motor-vehicle seat, particularly (but not exclusively) for the driving seat, comprising a cushion 2 and a backrest 3 having a supporting structure 4 which, in the illustrated embodiment, is comprised of a body in one piece, preferably of a light alloy, e.g. of a magnesium alloy, shaped as a tray (see FIG. 4) with a cavity 5 facing forwardly (see again FIG. 4) which receives the backrest 3 as well as the head-rest 6 at its extreme upper portion.

Figure 2:
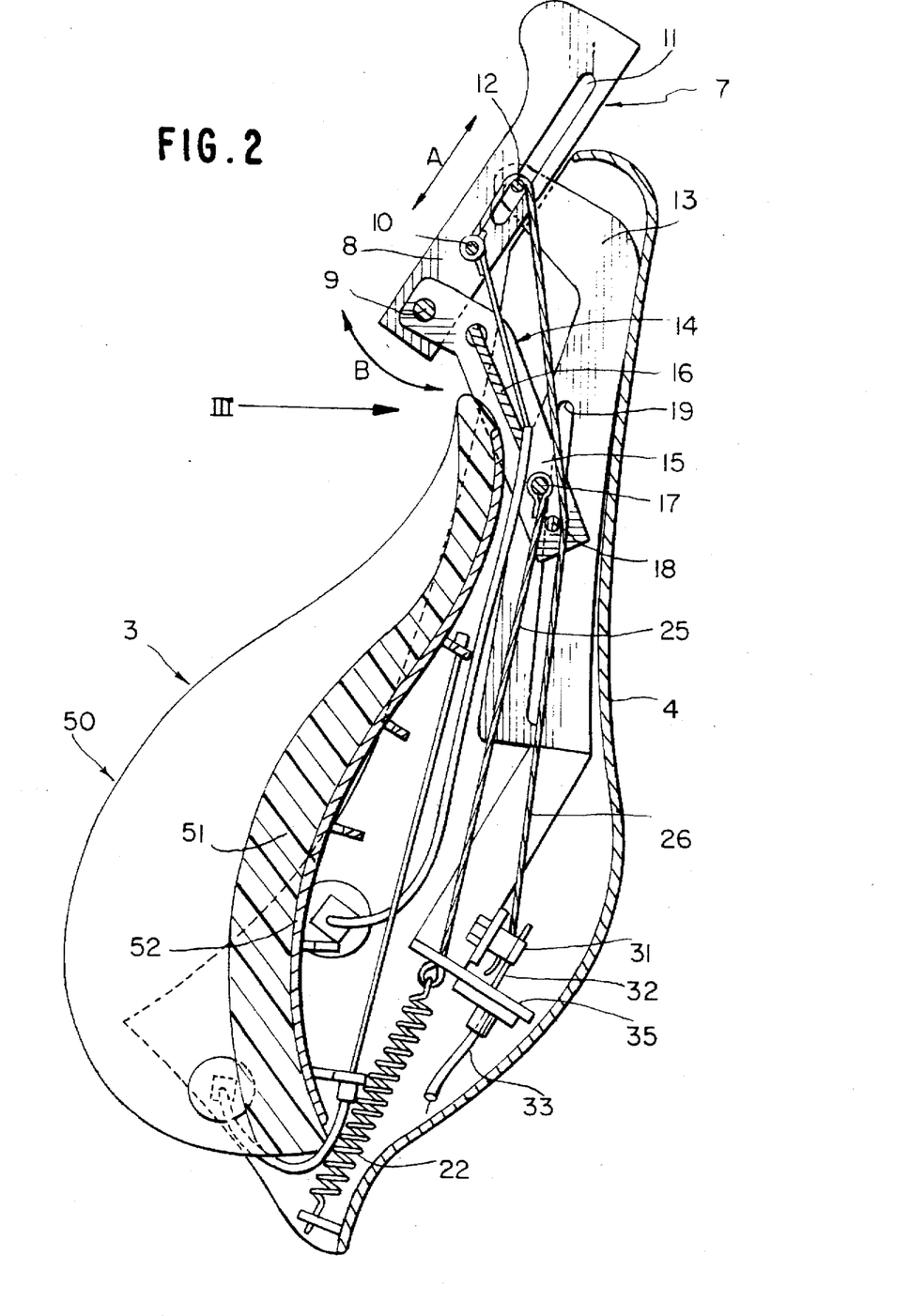
FIG. 2 is a cross-sectional view taken along line II—II of FIG. 1, at an enlarged scale, with the head-rest padding portion removed, for sake of clarity of illustration.
Figure 3:
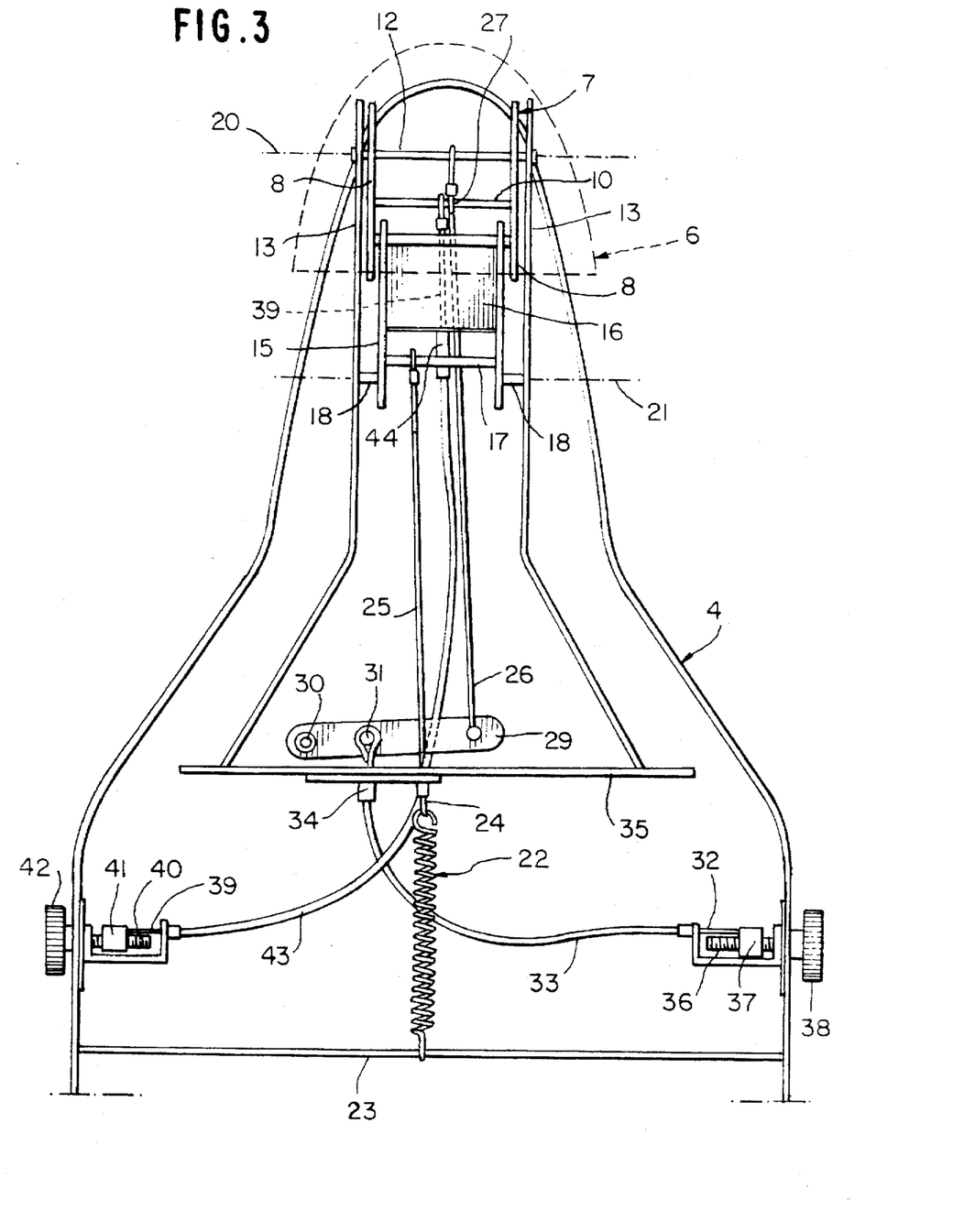
FIG. 3 is a front view of the structure shown in FIG. 2.
Figure 4:
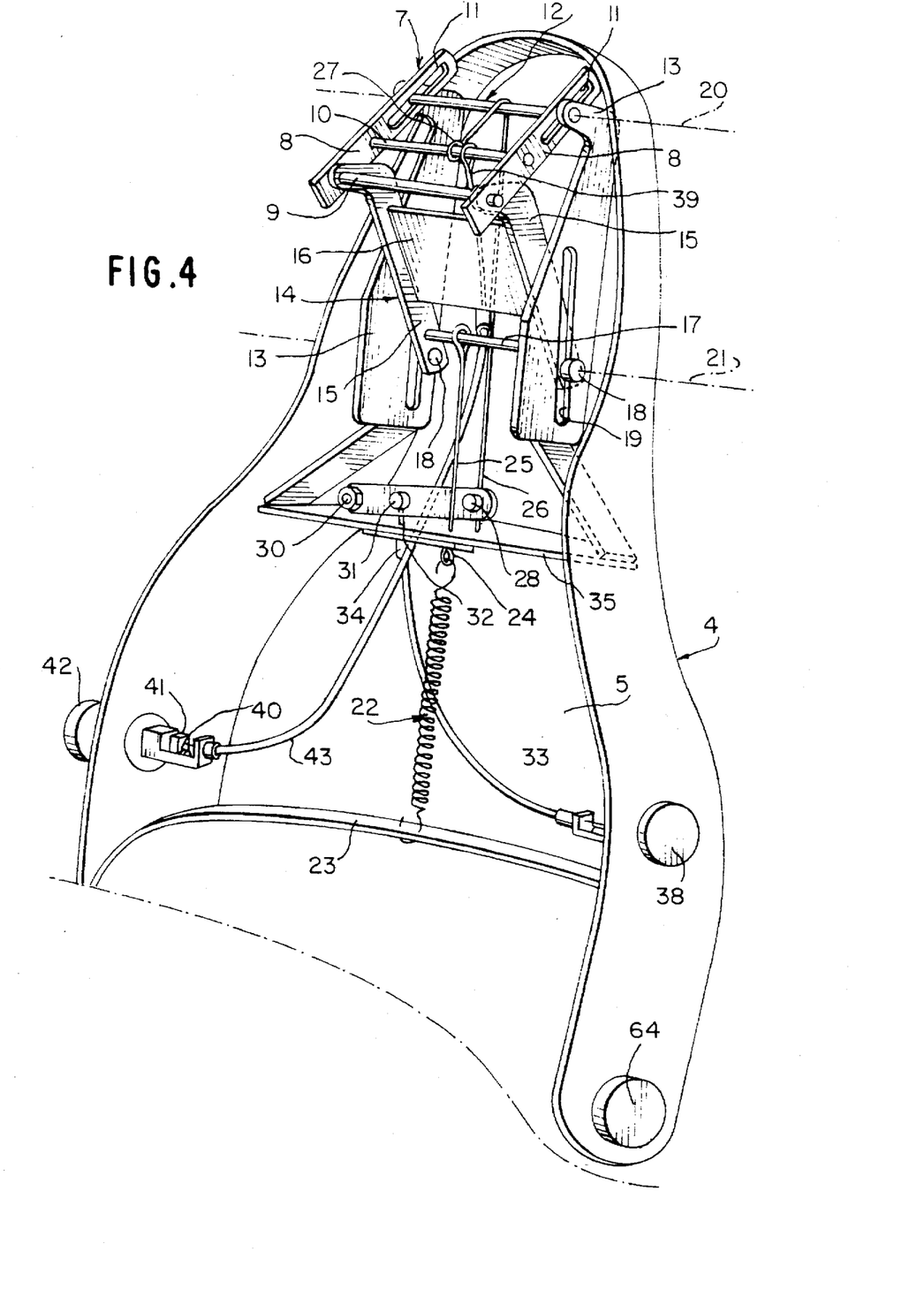
FIG. 4 is a perspective view of the structure of FIG. 2.
Figure 5:
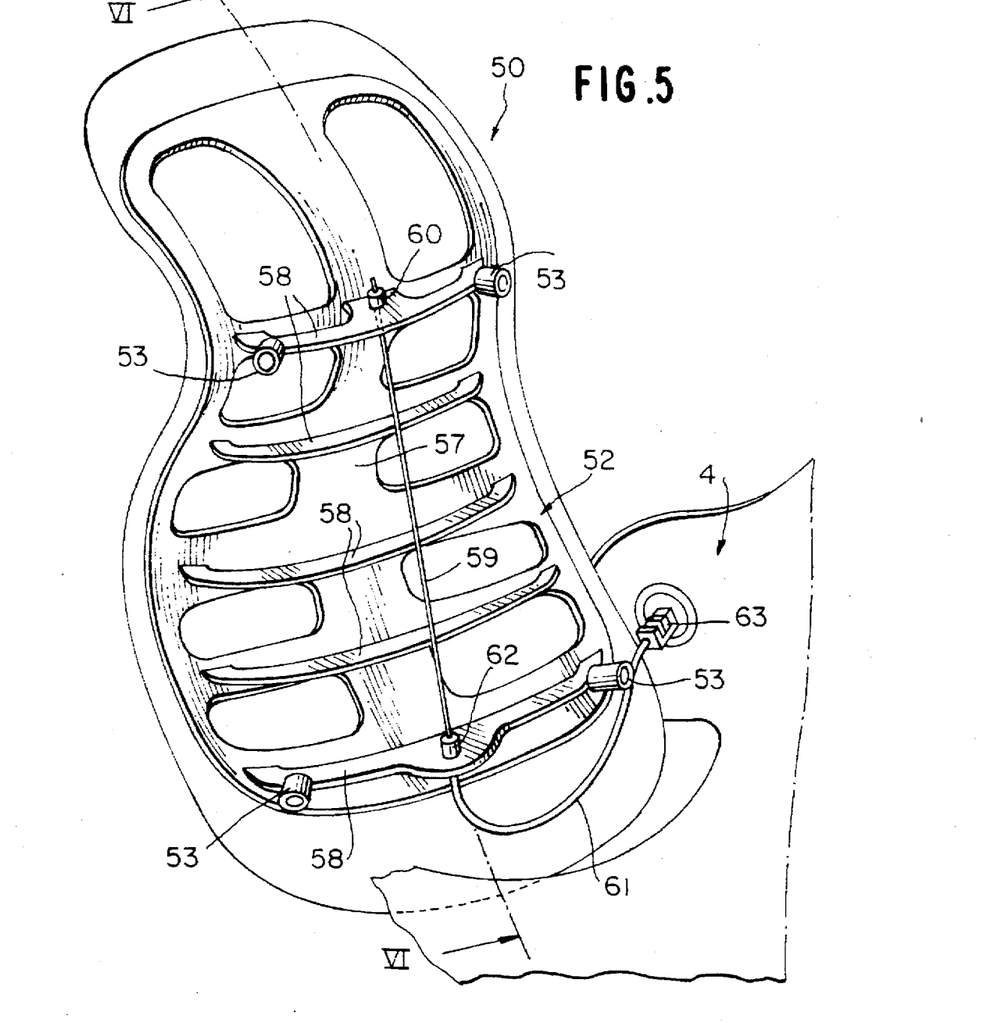
FIG. 5 is a rear perspective view of the backrest padding module of the seat of FIG. 1, shown in a condition spaced apart from the backrest supporting structure.
Figure 6:
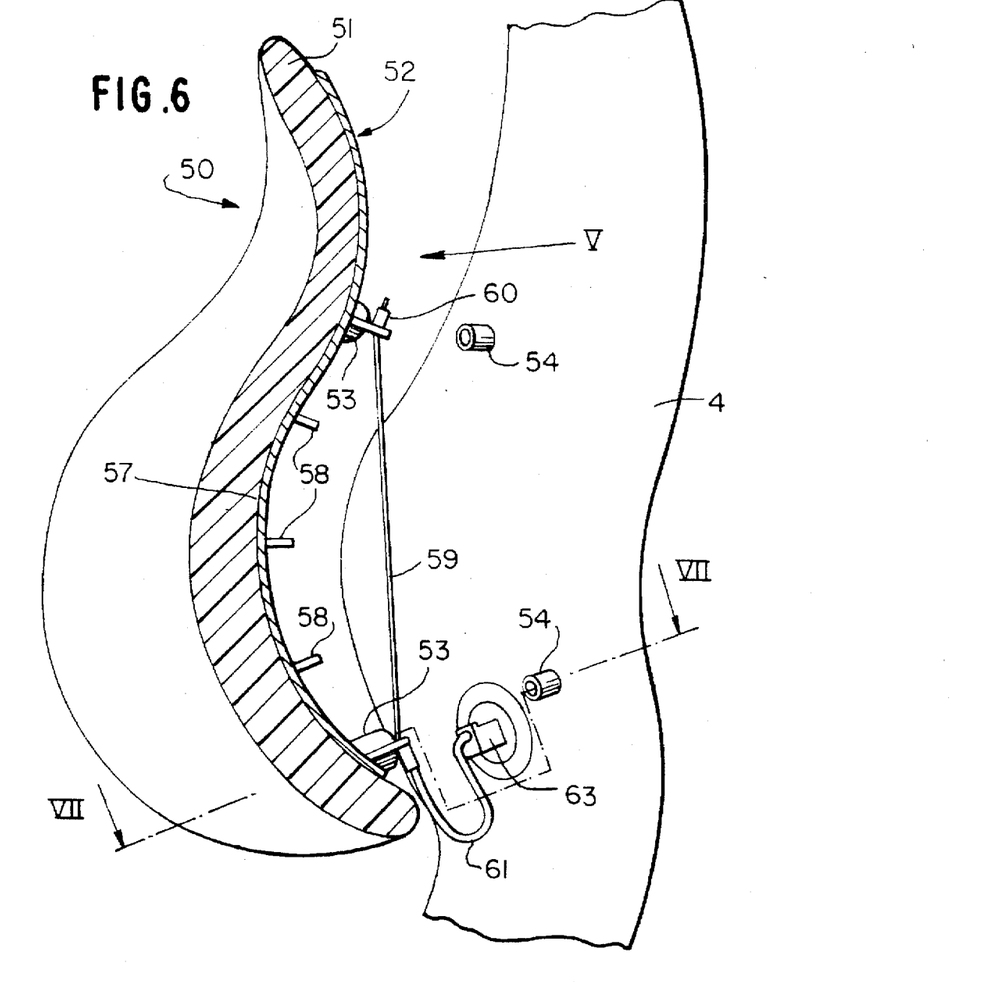
FIG. 6 is a side view in cross section taken along line VI—VI of FIG. 5.
Figure 7:
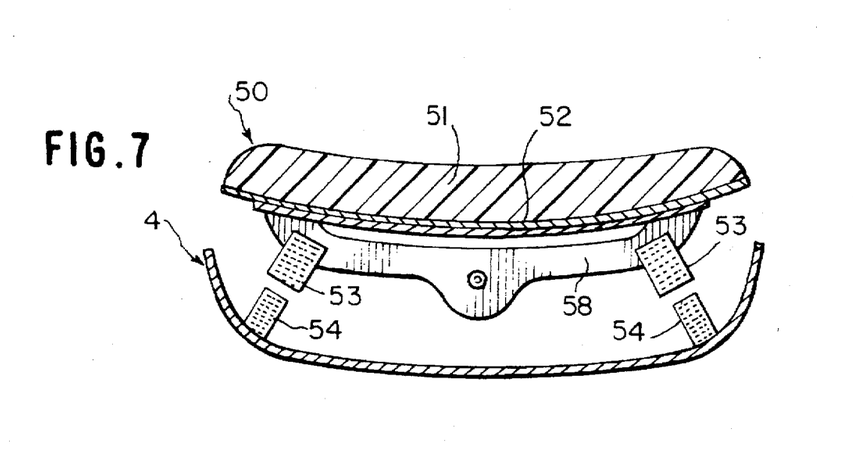
FIG. 7 is a cross-sectional view taken along line VII—VII of FIG. 6.

With reference to FIGS. 2, 3 and 4, which are a view in a side cross section of the backrest, a front view along arrow III of FIG. 2 and a perspective view of the supporting structure 4 of the backrest with the supporting mechanism for the head-rest 6, respectively, in these figures, the padding of head-rest 6 is not illustrated, in order to show clearly the supporting frame of head-rest 6, designated by reference numeral 7. The head-rest padding is made in any known way of a foamed plastic material, with the associated cover of textile or the like, and is to be anchored to frame 7 also in any known way. It is yet to be noted that the particular configuration of the frame 7 which is shown in the annexed drawings is illustrated purely by way of example, since this configuration may of course be different from what has been illustrated. In the embodiment described herein, frame 7 comprises two elongated side plates 8 connected to each other by two cross bars 9, 10 and having two longitudinal guide slots 11 wherein there is slidably and rotatably engaged a first transverse shaft 12 whose ends are rigidly connected to two brackets 13 projecting from the bottom wall of the tray-shaped body 4 and are rigidly connected to the latter.

The ends of plates 8 opposite to slots 11 are pivoted, by means of the cross bar 9, which acts as an articulation pin, to an auxiliary arm 14 which, in the specific example illustrated, comprises two elongated side plates 15 connected to each other by a cross plate 16 and a cross bar 17. The ends of plates 15 opposite to those articulated to bar 5 each carries a second transverse shaft 18 which is rotatably and slidably mounted within a longitudinal guide slot 19 formed vertically within the respective bracket 13.

Due to the above described arrangement, the frame 7 has the possibility both of pivoting around axis 20 of the first transverse shaft 12, and moving with respective to this axis 20 along the direction of slots 11, which is a substantially vertical direction designated by A in FIG. 2, the possibility of pivoting around axis 20 being indicated by arrows B in the same figure. At the same time, a rotation of frame 7 around axis 20 is accompanied by a corresponding movement of shafts 18 within the respective guide slots 19 with the resulting rotation of auxiliary arm 14 around the transverse axis 21 of shafts 18.

Reference numeral 22 designates a helical spring interposed between an inner rib 23 of the supporting structure 4 and one end 24 of a flexible cable 25 whose opposite end is anchored to the cross bar 17 of auxiliary arm 14. Spring 22 is able to bias downwardly the cross bar 17 and hence the auxiliary arm 14, thus biassing shafts 18 towards the lower ends of the two respective guide slots 19. An upward movement along direction A of FIG. 2 of frame 7 of the head-rest 6 is controlled, against the action of the return spring 22, by a flexible cable 26 having end 27 anchored to the cross bar 10, directed around transverse shaft 12 and having the opposite end connected at 28 to a lever 29 which is pivotally mounted at 30 to the seat supporting structure 4. Lever 29 acts as a system for multiplying displacement, since it is connected at a point 31 which is spaced from articulation axis 30 of a length lower than the distance between axis 30 and the connecting point 28 of cable 26, to one end of a flexible cable 32 provided with a sheath 33 whose end 34 is anchored to an inner rib 35 of body 4. The flexible cable 32 may be put under tension by a screw-and-nut mechanism 36, 37 of a type known per se controlled by a control knob 38 arranged on the left side of body 4 or, alternatively, by an actuating electric motor (not shown). A rotation of knob 38 causes a corresponding rotation of screw 36 and a resulting axial movement of nut 37 which is connected to the flexible cable 32. The cable 32 therefore causes a clockwise rotation (with reference to FIG. 3) around articulation axis 30 which causes the resulting movement of flexible cable 26 through a distance which is multiplied with respect to the length of the displacement of cable 32. This arrangement is particularly advantageous, since the linear displacement which can be provided by a screw-and-nut actuator of the type as device 36, 37 is necessarily reduced, while the adjusting movement of head-rest 6 along direction A must cover a given distance to allow the position of the head-rest to be suited to any height of the user.

As it is clearly apparent from the foregoing description, an actuation of knob 38 which causes tensioning of cable 32 causes, as indicated already, a clockwise rotation (with reference to FIG. 3) of lever 29 and a resulting tensioning of flexible cable 26. The latter, because it is directed around shaft 12, biasses cross bar 10 upwardly and the whole frame 7 of the head-rest therealong, which can slide upwardly along direction A of FIG. 2 because of the sliding engagement of slots 11 over the ends of shaft 12. The sliding movement of frame 7 along direction A is accompanied by a corresponding rotation of the auxiliary arm 14 around axis 21 and if necessary by a slight vertical movement of shafts 18 within the respective guide slots 19. As indicated already, the sliding upwardly of head-rest 6 is carried out against the action of the return spring 22. If one wishes to lower the head-rest, it is possible to obtain an opposite movement by rotating in opposite direction the knob 38 so as to loose cables 32, 26, thus allowing a downward movement of frame 7 as a result of the action of spring 22.

A forward rotation of frame 7 of the head-rest around the articulation axis 20 may controlled by a second flexible cable 39 associated with a screw-and-nut mechanism 40, 41 of a similar type as the one discussed above, connected to a control knob 42 arranged on the left side of body 4, or alternatively by an actuating electric motor (not shown). Cable 39 is provided with a sheath 43 having an end 44 fixed to plate 16 of auxiliary arm 14, whereas the free end of cable 39 is anchored to the cross bar 10, so that a tensioning of cable 39 as a result of an actuation of knob 42 in the corresponding direction tends to move the points at which sheath end 44 and cable end 39 are connected to plate 16 and cross bar 10 respectively to move towards each other. As a result, a tensioning of cable 39 causes a decrease in the angle defined between frame 7 and auxiliary arm 14 at shaft 9 of mutual articulation. This produces an upward movement of shafts 18 within the respective guide slots 19 and a forward tilting movement of the lower portion of frame 7 around the respective articulation axis 20. Also this tilting movement is of course opposed by the return spring 22 which therefore fulfils this function both with respect to the adjustment movement A and the adjustment movement B. By rotating knob 42 in an opposite direction, return spring 22 is able to return shafts 18 downwardly, thus rotating rearwardly frame 7 around axis 20.

The rotation of head-rest 6 designated by double arrow B in FIG. 2 allow the lower edge of head-rest to be positioned immediately adjacent to the head of the user even when it is greatly displaced forwardly with respect to the plane of the backrest. With reference now to FIGS. 2, 5–7 and 9, the backrest 3 of the seat according to the invention has a padding module 50, which can be connected rapidly to the supporting body 4 of the backrest.

The padding module 50 comprises a padding 51 constituted by a thin mat of foamed plastic material, provided with a covering textile or the like and incorporating a supporting skeleton 52, e.g. constituted of a light alloy, provided with means for quick coupling to body 4.

Figure 9:
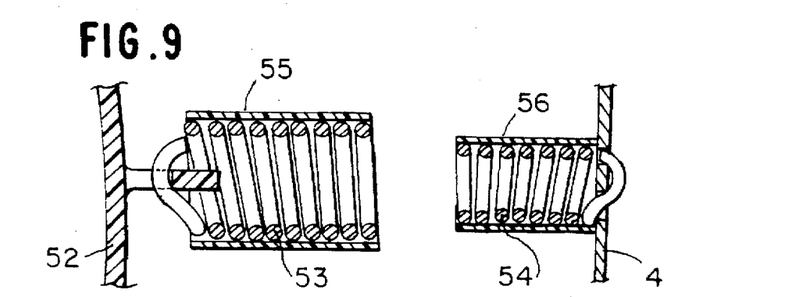
FIG. 9 is a view in cross-section and at an enlarged scale of a further detail of the seat according to the invention.

In the illustrated embodiment, said quick coupling means are comprised of four pairs of helical springs 53, 54, springs 53, 54 of each pair being supported in a cantilever fashion. (see in particular FIG. 9) by skeleton 52 and body 4 respectively and being able to engage within each other coaxially with a forced fit to connect padding module 50 to supporting body 4. As illustrated in FIG. 9, springs 53, 54 are preferably provided with a cover of plastic material 55, 56, in order to prevent a mutual jamming of the loops of the springs in the engagement condition. Due to the above described arrangement, springs 53, 54 fulfil both the function of quick coupling means for coupling the padding module 50 to the supporting body 4, and the function of elastic suspension means interposed between the padding module 50 and body 4.

As it is clearly apparent from the drawings, skeleton 52 is provided so as to have a flexible arched spine 57, whose arching is adjustable, extending centrally throughout the vertical extension of skeleton 52. At the same time, the skeleton 52 includes a plurality of transverse ribs 58 which are relatively rigid, which contribute to keep the configuration of skeleton 52, and hence that of padding module 51 with respect to a cross-section lying in a horizontal plane substantially constant. The arching of spine 57 may be adjusted by a flexible cable 59 having one end 60 connected to an upper rib 58 of the skeleton and provided with a sheath 61 whose end 62 is fixed to a lower rib 58. Cable 59 may be put under tension by a conventional screw-and-nut mechanism controlled by knob 64 (FIG. 4) arranged on the left side of body 4, in order to increase the arching of spine 57. By rotating knob 64 in an opposite direction, cable 59 is loosened thus allowing skeleton 52 to return towards its undeformed condition, with a minimum arching.

The above described adjustment movement allows the padding module to be adapted to various configurations of the back of the user, to ensure a proper support particularly at the lumbar area.

The above described particular arrangement of concentric springs 53, 54 also allows some movement of the whole padding module 50 in the vertical direction, due to the possibility of the whole body of each spring to be deflected. This possibility can be exploited, in a variant of the illustrated embodiment, to add adjustment mode to the backrest.

According to this solution, skeleton 52 is for example connected at its lower part to a return spring (of the type as spring 22 of FIG. 4) anchored at its opposite end to the body of the backrest, so as to bias downwardly the whole padding module. The latter can be moved upwardly by a further flexible cable control device connected to the upper portion of skeleton 52 and arranged so as to bias this skeleton upwardly when the cable is put under tension.

Figure 1:
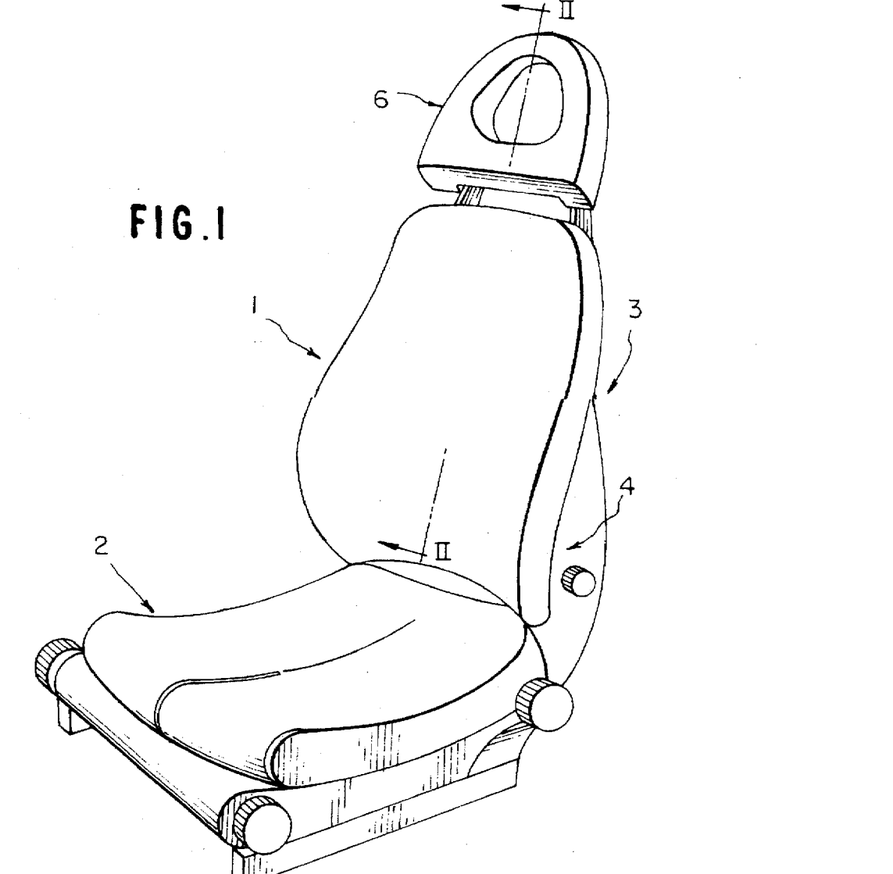
FIG. 1 is a perspective view of a preferred embodiment of the seat according to the invention.
Figure 8:
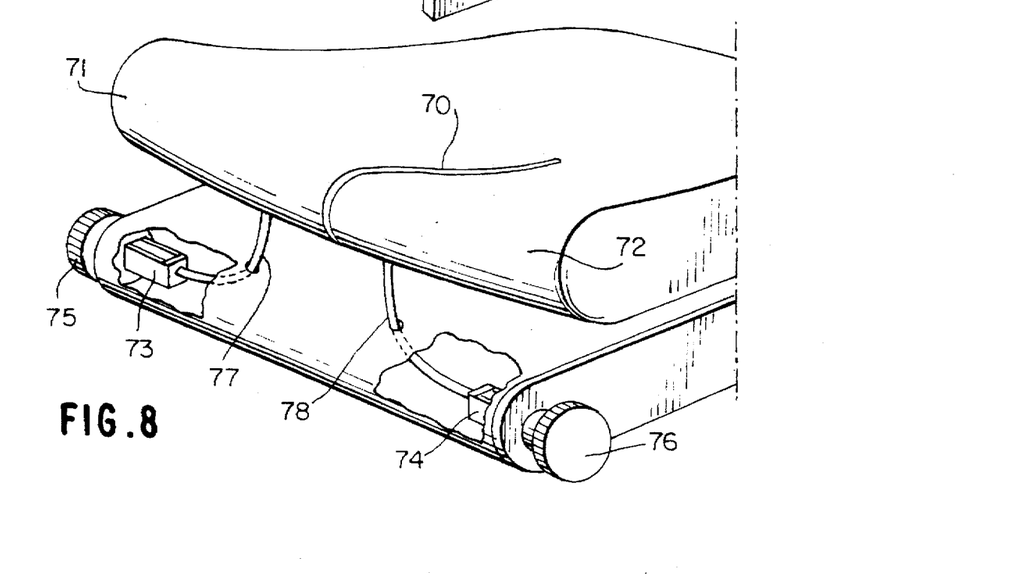
FIG. 8 is a perspective view at an enlarged scale of a detail of the cushion of the seat of FIG. 1.

With reference also to FIGS. 1, 8, a further preferred feature of the seat according to the invention lies in that the seat 2 has at its front portion a middle longitudinal slit 70 which defines two separate portions 71, 72, each of which has a flexible supporting structure (not visible in the drawings) which is slightly arched upwardly in its undeformed condition. Starting from this condition, each of the two structures 71, 72 may be deflected downwardly by a respective screw-and-nut control device 73, 74, controlled by a respective knob 75, 76 (or an actuating electric motor) to put a respective control flexible cable 77, 78 under tension. This arrangement allows the two portions 71, 72 to be independently adjusted at the various heights, as a function of the support required by the right and left thigh respectively of the user, as a function of the assumed posture, for example during driving.

Naturally, while the principle of the invention remains the same, the details of construction and the embodiments may widely vary with respect to what has been described and illustrated purely by way of example, without departing from the scope of the present invention.

What is claimed is:

1. Motor-vehicle seat, comprising:

a backrest, having a supporting structure, and a head-rest, including a supporting frame mounted onto the supporting structure of the backrest, wherein said supporting frame of the head-rest is mounted onto the supporting structure so as to be both adjustable by a first movement along a substantially vertical direction and rotatable by a second movement around a transverse axis with respect to the supporting structure of the backrest, and in that there are provided first and second separate flexible cable control means, respectively for controlling said first and second movements of the frame of the head-rest, in order to adjust the position of the latter, wherein the frame of the head-rest is mounted so as to be rotatable around a first transverse axis on the supporting structure of the backrest, while being slidable in a substantially vertical direction, in that there is provided an auxiliary arm having an upper end pivoted to the lower end of the frame of the head-rest and a lower end pivoted around a second transverse axis to the supporting structure of the backrest, said second transverse axis (21) being slidable along a substantially vertical direction, and wherein said first control means comprises a first flexible cable having one end connected to the frame of the head-rest and arranged so as to pull said frame upwardly, causing said movement along a substantially vertical direction with respect to the supporting structure of the backrest, when said first cable is put under tension, wherein said second control means comprises a second flexible cable interposed between said frame and said auxiliary arm so as to decrease the angle defined between said frame and said auxiliary arm when said second cable is put under tension, and wherein a single return spring is interposed between the supporting structure of the backrest and said auxiliary arm, so as to bias said second transverse axis downwardly.

2. Seat according to claim 3, characterized in that said frame of the head-rest is slidably and rotatably mounted on said first transverse axis by the engagement of a first transverse shaft carried by the supporting structure of the backrest within at least one guide slot formed in said frame.

3. Seat according to claim 2, characterized in that said first cable is directed around said first transverse shaft.

4. Seat according to claim 3, characterized in that an end of said first cable opposite to said one end connected to said frame is connected to a device for controlling tensioning of the cable by means of a lever system for multiplying the movement of the cable.

5. Seat according to claim 4, characterized in that said device for controlling tensioning of a cable comprises a screw-and-nut mechanism.

6. Seat according to claim 5, characterized in that said screw-and-nut mechanism is controlled by a control knob.

7. Seat according to claim 6, characterized in that said screw-and-nut mechanism is controlled by an actuating electric motor.

8. Seat according to claim 2, characterized in that said auxiliary arm carries a second transverse shaft which is slidably and rotatably guided within at least one guide slot formed in the supporting structure of the backrest, said second cable having one end connected to said frame, a sheath connected to said auxiliary arm and a second end connected to a device for controlling tensioning of the cable.

9. Seat according to claim 8, characterized in that said device for controlling tensioning of a cable comprises a screw-and-nut mechanism.

10. Seat according to claim 1, further comprising a padding module, including one supporting skeleton and a padding provided with a cover mounted onto the supporting skeleton and quick coupling means in mounting said module onto said supporting structure of said backrest said supporting skeleton including a flexible arched spine, whose arching is adjustable, and a plurality of substantially rigid transverse ribs, able to keep the configuration of the padding module in a cross section lying in a horizontal plane substantially constant, said seat further comprising a third flexible cable control means for causing arching of said spine.

11. Seat according to claim 10, wherein said quick coupling means between said supporting structure of the backrest and said padding module are comprised of spring means.

12. Seat according to claim 11, characterized in that said spring means are comprised of a plurality of pairs of helical springs, the springs of each pair being opposingly supported in a cantilever fashion by the backrest supporting structure and the padding module respectively and being able to engage concentrically and with a forced fit one within the other, so as to form said quick coupling means while fulfilling the function of suspension for the padding module.

13. Seat according to claim 12, characterized in that said springs are provided each with a covering sheath to prevent jamming of the respective loops the condition of mutual engagement of the springs of each pair.

14. Seat according to claim 10, characterized in that said flexible cable control means comprise a flexible cable arranged so as to move the ends of said spine towards each other when said cable is put under tension.

15. Seat according to claim 14, characterized in that there is provided a control device for tensioning of said cable, including a screw-and-nut mechanism.

16. Seat according to claim 15, characterized in that said screw-and-nut mechanism is controlled by a control knob.

17. Seat according to claim 15, characterized in that said screw-and-nut mechanism is controlled by an actuating electric motor.

18. Seat according to claim 10, characterized in that said padding module is supported by said supporting structure of the backrest so as to be movable in a substantially vertical direction with respect to said supporting structure, and in that there are provided spring means to bias the padding module downwardly and flexible cable control means to cause a movement of said module upwardly; against the action of said spring means.

19. Seat according to claim 10, characterized in that said supporting structure of the backrest is constituted by tray-shaped body with a cavity facing forwardly, which receives said padding module and the head-rest of the backrest.

20. Seat according to claim 2, characterized in that said supporting structure of the backrest is constituted by a tray-shaped body with a cavity facing forwardly, which receives said padding module and the head-rest of the backrest.

21. Seat according to claim 20, characterized in that said body is constituted of a light alloy.

22. Seat according to claim 2, characterized in that said seat has a cushion which at its front portion has a middle longitudinal slit which defines two separate front portions, which are flexible and slightly arched upwardly in their undeformed condition, said portions being deflectable downwardly by means of respective flexible cable control devices to adjust the position in height of said front portions of the cushion separately.

* * * * *